(12) United States Patent
Jorgenson et al.

(10) Patent No.: US 6,901,833 B2
(45) Date of Patent: Jun. 7, 2005

(54) AUTOMATED TUBE TRIMMING SYSTEM

(75) Inventors: Edward O. Jorgenson, Auburn, WA (US); Albert L. Hametner, Seattle, WA (US)

(73) Assignee: The Boeing Company, Chicago, IL (US)

(*) Notice: Subject to any disclaimer, the term of this patent is extended or adjusted under 35 U.S.C. 154(b) by 287 days.

(21) Appl. No.: 10/302,185

(22) Filed: Nov. 22, 2002

(65) Prior Publication Data

US 2004/0098864 A1 May 27, 2004

(51) Int. Cl.[7] .................................................. B26D 3/16
(52) U.S. Cl. ............................. 83/54; 83/56; 83/452; 83/471.2; 30/52; 82/70.2; 269/37
(58) Field of Search ........................ 83/54, 56, 471.2, 83/452; 30/92–94, 95–98, 101, 102; 82/58, 53.1, 59, 70.2, 83, 84, 89; 29/564.8; 269/37

(56) References Cited

U.S. PATENT DOCUMENTS

| | | | | | |
|---|---|---|---|---|---|
| 2,619,174 A | * | 11/1952 | Neale | ............................. | 82/71 |
| 3,385,148 A | * | 5/1968 | Piazza | ........................ | 82/70.2 |
| 3,756,100 A | * | 9/1973 | Bachmann | .................... | 82/113 |
| 4,213,357 A | * | 7/1980 | Lively et al. | ................. | 82/113 |
| 4,359,820 A | * | 11/1982 | Wheeler et al. | ................ | 30/97 |
| 4,412,401 A | * | 11/1983 | Fundell | ....................... | 451/242 |
| 4,944,205 A | * | 7/1990 | Ricci | ............................ | 82/113 |
| 5,199,221 A | * | 4/1993 | Hillestad | ..................... | 451/154 |
| 5,667,185 A | * | 9/1997 | Maglica | ....................... | 248/541 |
| 5,956,853 A | * | 9/1999 | Watamura | ...................... | 30/95 |
| 6,009,780 A | * | 1/2000 | Savioli | ....................... | 82/53.1 |
| 6,102,384 A | * | 8/2000 | Simmons | ...................... | 269/37 |

* cited by examiner

Primary Examiner—Timothy V. Eley
Assistant Examiner—Phong Nguyen
(74) Attorney, Agent, or Firm—Shimokaji & Associates, P.C.

(57) ABSTRACT

An automated tube trimming system accurately trims tubes to the correct height and angle. The tube trimming system is a combination of an automated trimming saw and a unique spherical tube clamping system. A spherical clamp having a fixed clamp section and an internal swivel portion is used to clamp a tube at an appropriate angle for cutting in an automated tube trimming saw. The spherical clamp may be tightened onto the tube at an angle appropriate to provide the correct mating cut to easily weld to a second mating tube section or fitting. Conventional methods cut perpendicular to the direction of the tube, thereby requiring time consuming and labor intensive grinding and deburring. The ability to provide accurate and simple formation of trimmed tubes may be useful in a wide variety of industries where the movement of air and fluid through tubes is performed.

14 Claims, 5 Drawing Sheets

AUTOMATED TUBE TRIMMING SYSTEM

BACKGROUND OF THE INVENTION

The present invention generally relates to a tube trimming system for trimming tube ends to the desired length and angle. More specifically, the present invention relates to an automated tube trimming system, including a trim machine and a spherical clamp assembly, useful for weld joints and end fittings.

Conventional tube trimming quality is very dependent on the craftsmanship of the individual. While tube trimming may at first sound like a simple task, due to the combination of base material, wall thickness, large range of diameters, tube ovality and unique part configurations, tube trimming becomes a complex task.

One of the challenges that exist on bent tubes is the problem of bend angle variation. Depending on whether a tube is over or under bent, or bent slightly out of rotation, it will not fit into an assembly fixture with both ends square and true. If the tube is trimmed perpendicular to the tube surface, it will not match up to the mating tube or end fitting correctly. Therefore, the tube must be trimmed with a slight miter to allow the mating tube or end fitting to correctly line up for welding. One of the things that assembly mechanics do to overcome slight variations in bend angles is to slightly miter the end of the tube by hand trimming and grinding. This is a very time consuming process that requires a lot of craftsmanship. Existing tube trimming technology is made to trim the tube square to the tube surface, resulting in a gap when the mating part is assembled.

Conventionally, a tube trimming sequence begins with the tube being located into an assembly fixture. The tube is aligned to the fixture and retained with elastic straps. The tube end is then scribed using a hand held scribing device which is manually rotated along the surface of a scribing header on the fixture. Once a scribe line is made completely around the tube, the tube is removed from the fixture. The assembler then manually trims the tube as close to the scribe line as possible using either a band saw, power shear or hand snips. The tube is then sanded to the scribe line using either a power disc sander or hand held sanding block. The part is then manually deburred and hand cleaned. It is then placed back into the fixture, and the mating part is located to verify the trim operation is acceptable. If the joint is not acceptable, then it is hand worked until a good fit is obtained. This process is all done manually, requiring a high level of skill and craftsmanship to obtain a good fit with the mating part to insure a good weld. The process time for these operations varies greatly depending on the quality of the detail and the skill of the assembly mechanic.

As can be seen from the above conventional process, trimming tubes is a very labor intensive process. In addition to the amount of skill and time required to perform this task, the assembly mechanic is exposed to several sources of cumulative trauma disorder. For example, the repetitive tasks of scribing, cutting, grinding and deburring lead to medical conditions such as carpal tunnel syndrome.

As can be seen, there is a need for an improved tube trimming system for rapidly trimming tubes to an appropriate height and angle. There is a need for such an improved system wherein tubes are trimmed by a robust, reproducible, hands-free method requiring minimal manual labor and minimal factory space.

SUMMARY OF THE INVENTION

In one aspect of the present invention, a tube trimming system for cutting a tube comprises a trimming saw located on a first side of a work surface; a hole in the work surface communicating the trimming saw with a second, opposite side of the work surface; a spherical clamp for holding the tube; and a clamping system for holding the tube in a fixed location during a trimming operation wherein the tube is inserted from the second, opposite side of the work surface, through the hole, and trimmed by the trimming saw.

In another aspect of the present invention, a tube trimming system for cutting a tube at a desired height and angle comprises a trimming saw, having a saw blade, being located a first side of a work surface; a saw blade drive motor rotating the saw blade; the saw blade being movable from a non-cutting position to a cutting position, the cutting position being a position wherein the saw blade cuts the tube during operation; a hole in the work surface communicating the trimming saw with a second, opposite side of the work surface; a rotating column, having a diameter larger than that of the hole, being located below the hole, wherein a tube moving through the hole from the second, opposite side would move into the rotating column; a rotation drive motor rotating the rotating column during operation of the trimming system; the saw blade and the saw blade drive motor being attached to the rotating column wherein rotation of the rotating column rotates the saw blade and the saw blade drive motor; a saw blade plunge motor for moving the saw blade from a non-cutting position to a cutting position; a spherical clamp for holding the tube; and a clamping system for holding the tube in a fixed location during a trimming operation wherein the tube is inserted from the second, opposite side of the work surface, through the hole, and trimmed by the trimming saw.

In yet another aspect of the present invention, a tube trimming system for cutting a tube at a desired height and angle comprises a trimming saw on a first side of a work surface; a hole in the work surface communicating the trimming saw with a second, opposite side of the work surface; a spherical clamp, having a fixed clamp section and an internal swivel section, for holding the tube; the fixed clamp section having a first arc section and a second arc section, the first arc section and the second arc section mating to form the fixed clamp section; the internal swivel section having an arc cut out section removed therefrom; an outside diameter of the internal swivel section being slightly larger than an inside diameter of the fixed clamp section; the first arc section and the second arc section coming together, with the internal swivel section fitted thereinbetween, to clamp down on the internal swivel section as the first arc section and the second arc section are mated to form the fixed clamp section, thereby narrowing the cut out section and reducing an inside diameter of the internal swivel section; the fixed clamp section clamping down on the internal swivel section to clamp the tube in place within the spherical clamp; the fixed clamp section having a first diameter being smaller than the hole and a second diameter being larger than the hole; the second diameter acting as a stop, thereby fixing the tube in the hole when the spherical clamp is clamped on a tube and the tube is fed through the hole; a spherical interface on an inside diameter wall of the fixed clamp section, wherein the spherical interface retains the internal swivel section and allows the internal swivel section to swivel therein, thereby permitting the spherical clamp to clamp the tube at an angle relative to perpendicular; and a clamping system for holding the tube in a fixed location during a trimming operation wherein the tube is inserted from the second, opposite side of the work surface, through the hole, and trimmed by the trimming saw.

In a further aspect of the present invention, a tube trimming system for cutting a tube at a desired height and angle comprises a trimming saw, having a saw blade, being located on a first side of a work surface; a saw blade drive motor rotating the saw blade; the saw blade being movable from a non-cutting position to a cutting position, the cutting position being a position wherein the saw blade cuts the tube during operation; a hole in the work surface communicating the trimming saw with a second, opposite side of the work surface; a rotating column, having a diameter larger than that of the hole, being located below the hole, wherein a tube moving through the hole from the second, opposite side would move into the rotating column; a rotation drive motor rotating the rotating column during operation of the trimming system; the saw blade and the saw blade drive motor being attached to the rotating column wherein rotation of the rotating column rotates the saw blade and the saw blade drive motor; a saw blade plunge motor for moving the saw blade from a non-cutting position to a cutting position; a spherical clamp, having a fixed clamp section and an internal swivel section, for holding the tube; the fixed clamp section having a first arc section and a second arc section, the first arc section and the second arc section mating to form the fixed clamp section; the internal swivel section having an arc cut out section removed therefrom; an outside diameter of the internal swivel section being slightly larger than an inside diameter of the fixed clamp section such that the fixed clamp section exerts a pressure on the internal swivel section when the first arc section is mated with the second arc section; the first arc section and the second arc section coming together, with the internal swivel section fitted thereinbetween, to clamp down on the internal swivel section as the first arc section and the second arc section are mated to form the fixed clamp section, thereby narrowing the cut out section and reducing an inside diameter of the internal swivel section; the fixed clamp section clamping down on the internal swivel section to clamp the tube in place within the spherical clamp; the fixed clamp section having a first diameter being smaller than the hole; the second diameter acting as a stop, thereby fixing the tube in the hole when the spherical clamp is clamped on a tube and the tube is fed through the hole; a spherical interface on an inside diameter wall of the fixed clamp section, wherein the spherical interface retains the internal swivel section and allows the internal swivel section to swivel therein, thereby permitting the spherical clamp to clamp the tube at an angle relative to perpendicular; and a clamping system for holding the tube in a fixed location during a trimming operation wherein the tube is inserted from the second, opposite side of the work surface, through the hole, and trimmed by the trimming saw.

In still a further aspect of the present invention, a method for trimming a tube comprises providing a spherical clamp having a fixed clamp section and an internal swivel section within the fixed clamp section; the fixed clamp section having a first arc section and a second arc section, the first arc section and the second arc section mating to form the fixed clamp section, the internal swivel section having an arc cut out section removed therefrom, wherein an outside diameter of the internal swivel section is larger than an inside diameter of the fixed clamp section; inserting the tube in the internal swivel section; mating the first arc section and the second arc section around the internal swivel section; tightening the first arc section to the second arc section, thereby tightening the clamp on the tube; inserting an end of the tube into a hole in a first side of a work surface; holding the tube in the spherical clamp to the work surface; and cutting the tube on a second opposite side of the work surface.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides an automated tube trimming system for accurately trimming tubes to the correct height and angle. The tube trimming system is a combination of an automated trimming saw and a unique spherical tube clamping system. The ability to provide accurate and simple formation of trimmed tubes may be useful in a wide variety of industries where the movement of air and fluid through tubes is performed. For example, the aircraft industry uses ducting for the movement of air, for fuel vent tubes and for fuel feed lines. The food processing industry and wineries also use tubes of various sizes and designs.

Conventional tube trimming methods require a significant amount of factory space and intensive manual labor to perform the various steps in the trimming process. The automated tube trimming system of the present invention eliminates these issues by trimming a tube with a single apparatus in relatively few steps.

Conventional tube trimming methods require a significant amount of user intervention to make the final product. The automated tube trimming system of the present invention addresses this issue by trimming a tube in an automated fashion, requiring very little operator time and intervention. This helps minimize the risk of cumulative trauma disorders on the mechanic.

Figure 1:
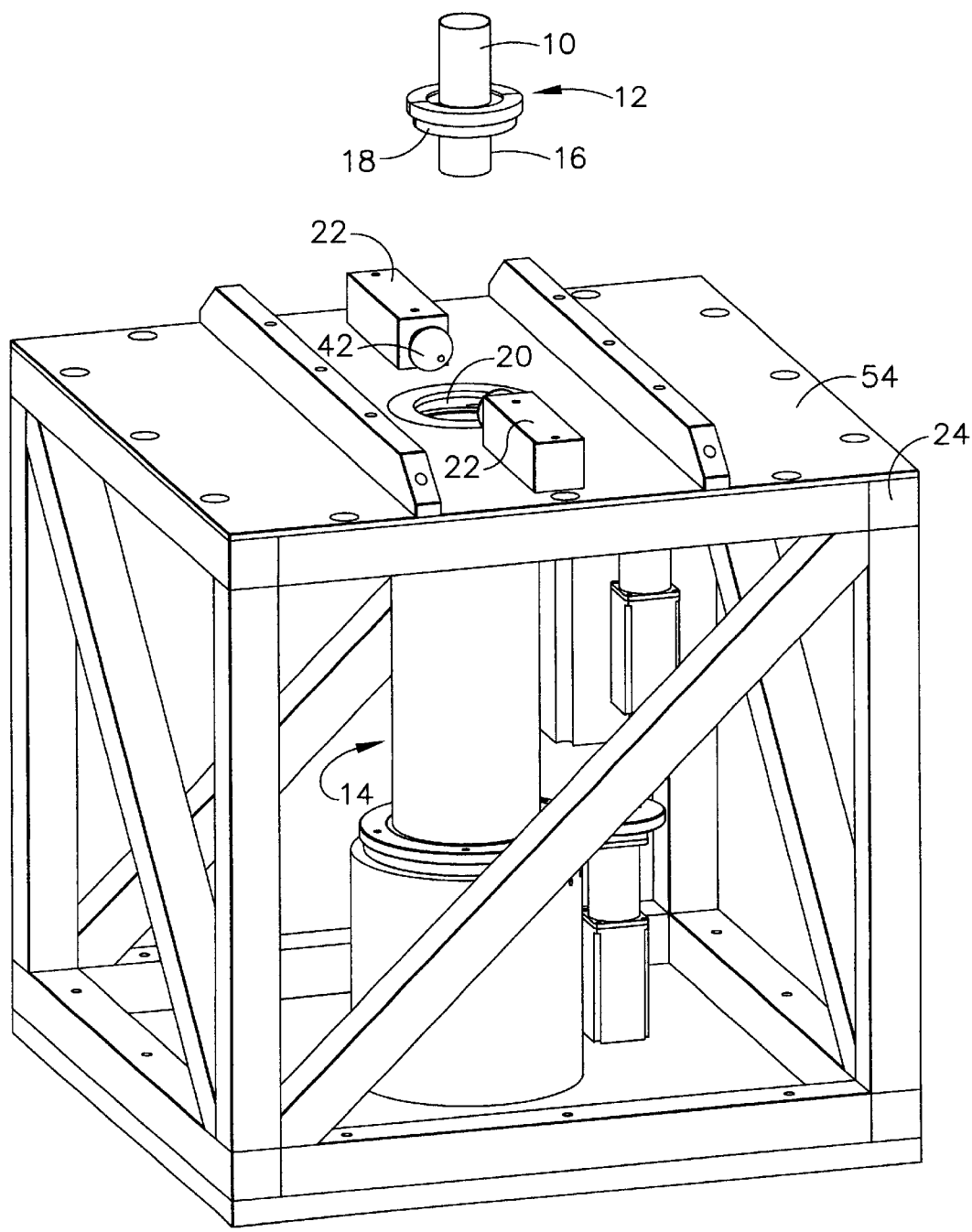
FIG. 1 is a perspective view of the tube trimming system according to an embodiment of the present invention.

Referring to FIG. 1, there is shown a perspective drawing of the tube trimming system according to the present invention. A tube 10 to be cut may be placed in spherical clamp 12. An end 16 of tube 10 to be cut may be inserted through spherical clamp 12 such that end 16 protrudes from a lower end 18 of spherical clamp 12. Lower end 18 may be inserted into a hole 20 of trimming saw frame 24. Spherical clamp 12 may be held into place by a clamping system 22. Trimming saw 14 may be located below hole 20 such end 16 may be cut when inserted through hole 20.

Clamping system 22 may include any known means for clamping spherical clamp 12 in place. For example, clamping system 22 may include cone shaped pieces attached to a rod, actuated by an air cylinder. Extension of the rods extends the cone shaped pieces to press against spherical clamp 12. Clamping system 22 may also contain an ultrasonic sensor 42 to determine the tube diameter.

Figure 2:
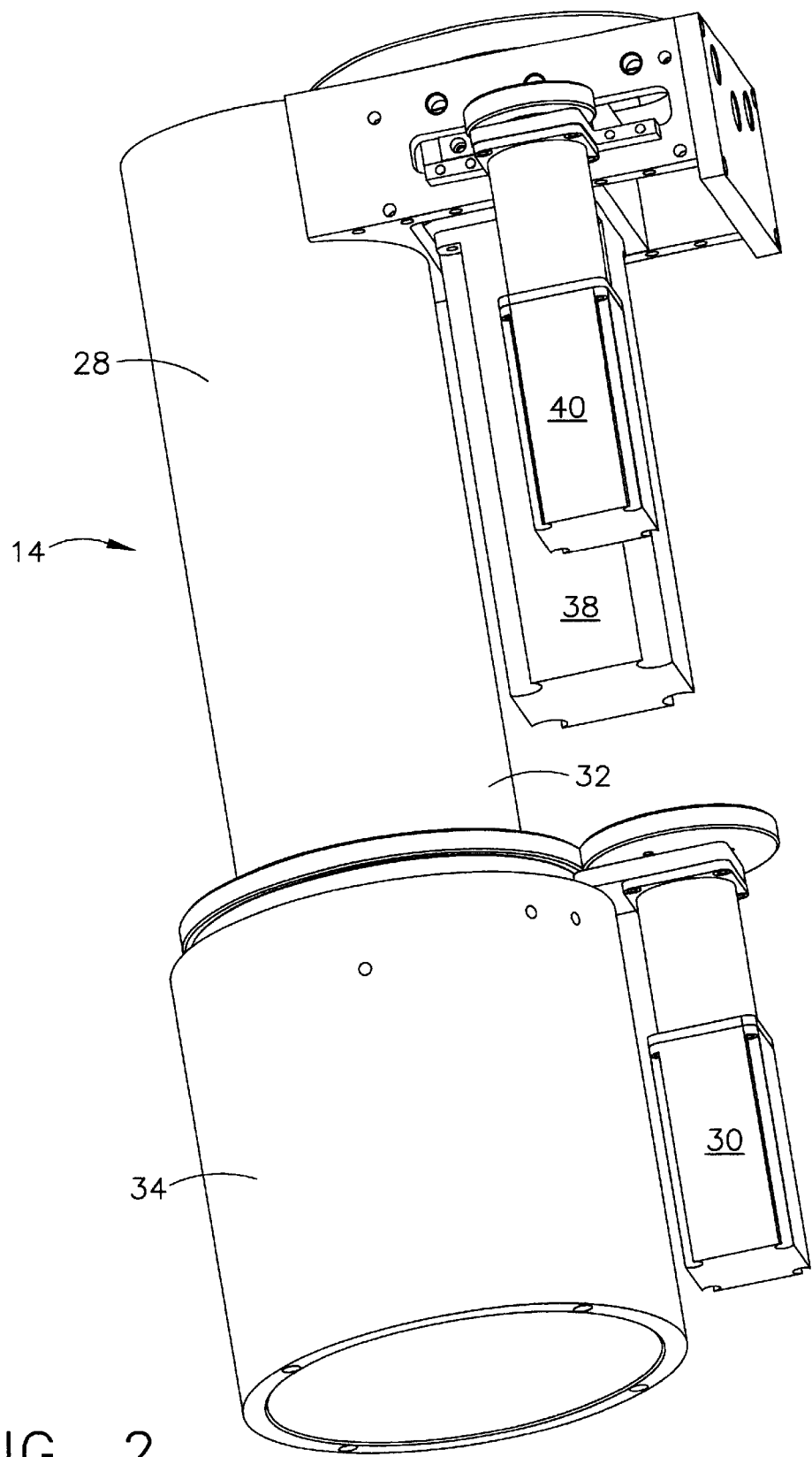
FIG. 2 is a perspective view of the trimming saw, with the guards removed, of FIG. 1.
Figure 3:
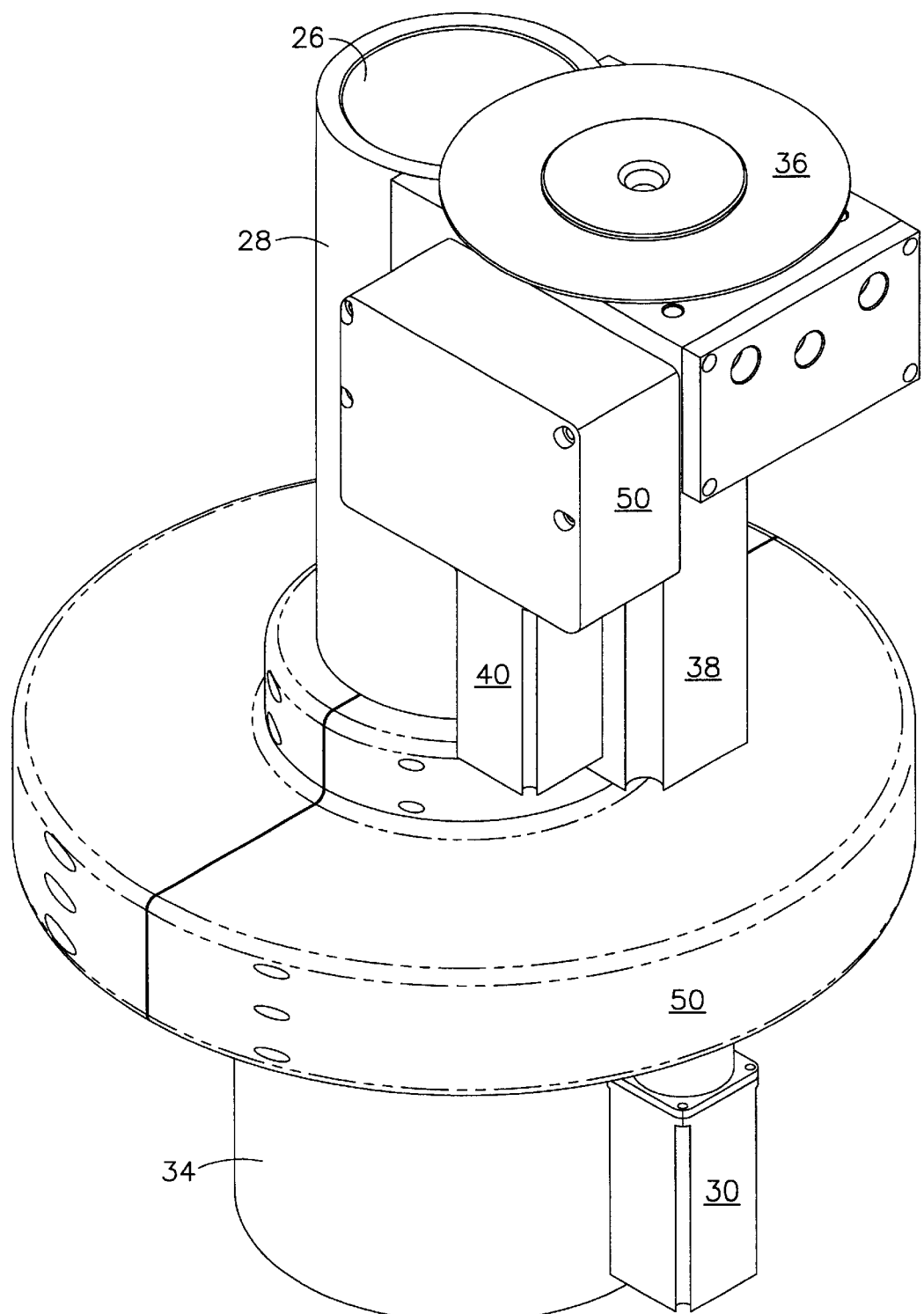
FIG. 3 is an alternate perspective view of the trimming saw of FIG. 2, with the guards in place.

Referring now to FIGS. 2 and 3, trimming saw 14 is described in greater detail. The trimming saw 14 of FIG. 2 may be the same trimming saw 14 of FIG. 3, simply with guards 50 removed. A rotating column 28 has a first opening 26 which may be aligned with hole 20 (see FIG. 1). Rotating column 28 may be rotated by rotation drive motor 30 located toward a second, opposite end 32 of rotating column 28. A fixed machine base 34 may be made of a hollow tube having a diameter at least as large as a diameter of rotating column 28. Second, opposite end 32 of rotating column is rotationally attached to fixed machine base 34. The hollow characteristic of fixed machine base 34 allows cut material to drop through trimming saw 14 to allow for easy removal of the excess cut material.

A saw blade 36 may be rotationally driven by a saw blade drive motor 38. A blade plunge drive motor 40 may move saw blade 36 in a direction perpendicular to rotating column 28. Saw blade 36 may be positioned just above first end 26. This placement allows saw blade 36 to protrude into the radius defined by first end 26 when driven by blade plunge drive motor 40. Saw blade 36, saw blade drive motor 38 and blade plunge motor 40 may be fixedly attached to rotating column 28.

The operation of trimming saw 14 will now be described referring to FIGS. 1 through 3. End 16 of tube 10 is placed through hole 20 with end 16 extending into first end 26 of rotating column 28. Clamping system 22 holds tube 10 in place via spherical clamp 12. Drive rotation motor 30 may be operated to rotate rotating column 28, thereby rotating saw blade 36. Saw blade drive motor 38 spins saw blade 36. Blade plunge drive motor 40 moves saw blade 36 into the radius of rotating column 28. Ultrasonic sensors 42 may measure the diameter of tube 10. A programmable logic controller (not shown) may use this measurement to appropriately adjust the cutting parameters including the plunge depth of saw blade 36 by blade plunge drive motor 40. By appropriately adjusting the plunge depth of saw blade 36, the amount of finishing labor required for steps such as deburring is minimized.

Figure 4:
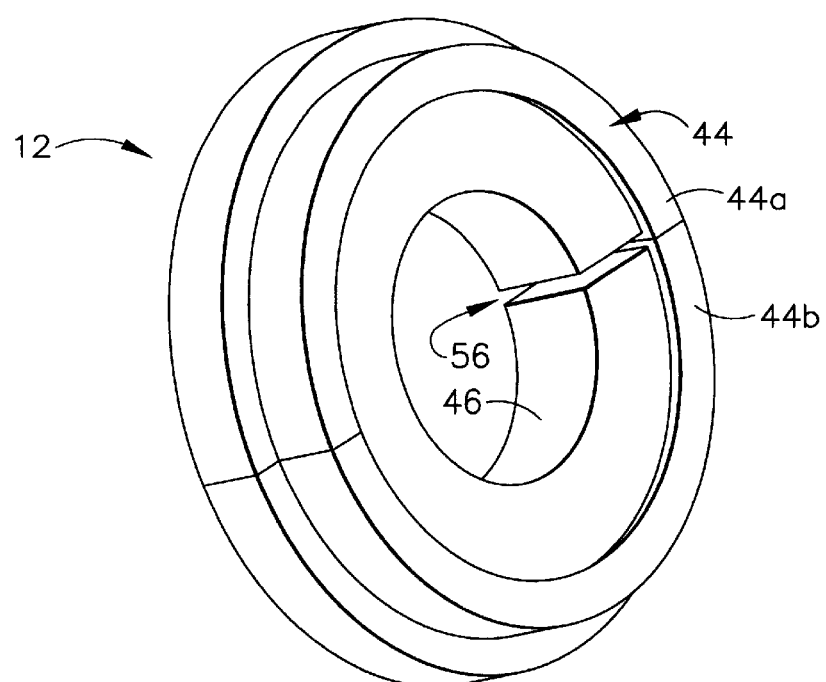
FIG. 4 is a perspective view of the spherical clamp according to an embodiment of the present invention.
Figure 5:
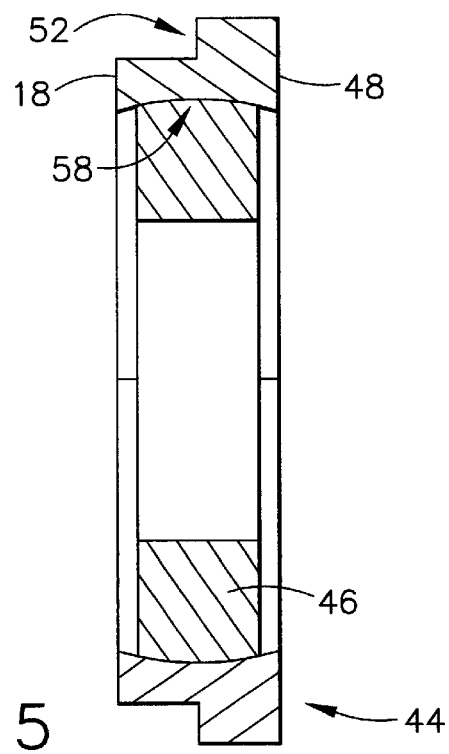
FIG. 5 is a cross-sectional view of the spherical clamp of FIG. 4.

Referring now to FIGS. 4 and 5, there are shown perspective and cross-sectional views, respectively, of the spherical clamp according to an embodiment of the present invention.

Spherical clamp 12 includes an external fixed clamp section 44 and an internal swivel section 46. Fixed clamp section 44 may be a two piece structure made of two semicircular arc sections 44a and 44b. Sections 44a and 44b may be clamped together to form external fixed clamp section 44 of spherical clamp 12 by any known means, such as threading section 44a and providing a bolt through a hole in section 44b to thread into section 44a, thereby holding section 44a and section 44b into circular alignment.

Lower end 18 of external fixed clamp section 44 has a smaller diameter than an upper, opposite end 48. A trimming index surface 52 is formed where the smaller diameter lower end 18 meets the larger diameter upper, opposite end 48. Hole 20 (see FIG. 1) may have a diameter larger than that of lower end 18, but smaller than that of upper, opposite end 48. Thus, trimming index surface 52 rests on a work surface 54 of trimming saw frame 24.

Internal swivel section 46 fits inside the radius of external fixed clamp section 44. A cut out section 56 may be made in internal swivel section.

A tube 10 may be inserted into internal swivel section 46, slightly forming a gap in cut out section 56. The gap in cut out section 56 may be from about 0.01 percent to about 10% of the radius of internal swivel section 46. External fixed clamp section 44 is then placed around internal swivel section 46. Sections 44a and 44b are mated and joined, thereby providing pressure on internal swivel section 46, closing the gap in cut out section 56, and clamping tube 10 in place in spherical clamp 12.

Figure 6:
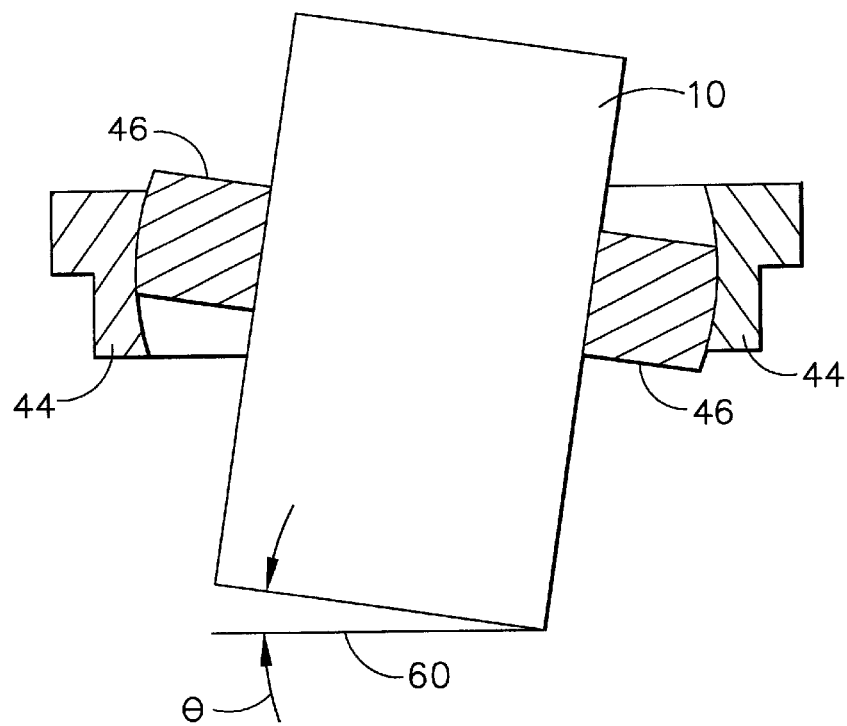
FIG. 6 is a cross-sectional view of a tube in place at an angle in the spherical clamp of FIG. 5.

Referring to FIGS. 5 and 6, an inside circumference of external fixed claim section 44 may be made with a spherical interface 58 serving two unique distinct functions. First, spherical interface 58 retains internal swivel section 46 within external fixed clamp section 44 when sections 44a and 44b and joined. Second, spherical interface 58 allows internal swivel section 46 to be clamped in place at an angle relative to external fixed clamp section 44. Thus, if tube 10 needs to be cut at an angle, tube 10 may be clamped in spherical clamp 12 at the appropriate angle for cutting by trimming saw 14. FIG. 6 shows one example where a tube end 60 is cut at an angle, theta, by trimming saw 14.

Figure 7:
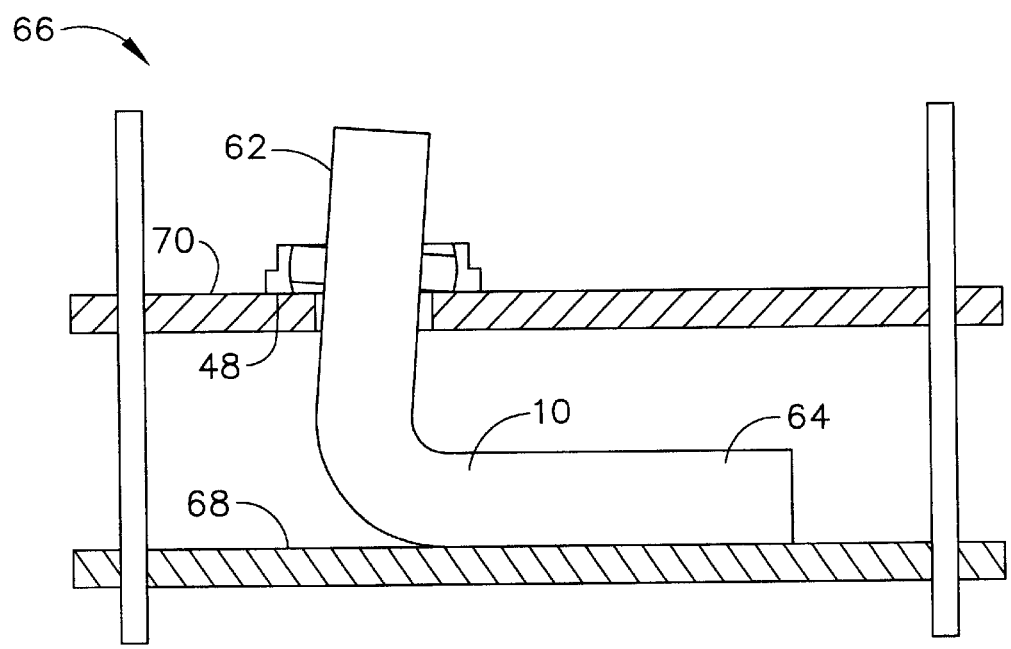
FIG. 7 is a cross-sectional view of a jig used to position the spherical clamp onto the tube at a desired angle.

Referring to FIG. 7, there is shown an example of a jig for trimming tube that has been, for example, over bent. As discussed above, if a right angle is overbent, or rotated during bending, the resulting angle will not be a true 90 degree angle. If cut tube section 62 is conventionally cut, such a method would make a cut perpendicular to cut tube section 62. Thus, when mated with another tube, a gap may exist between the two tubes, requiring manual sanding and grinding. Spherical clamp 14 allows for simple angular cutting of tubes and is easily adapted to solve this problem.

A simple jig 66 may be envisioned having a fixed surface 68 and a movable surface 70. Fixed surface 68 and movable surface 70 are, at all times, parallel to each other. An uncut tube section 64 may be secured against fixed surface 68. Movable surface, having a hole (not shown) therethrough to allow passage of cut tube section 62, is moved to an appropriate distance. Upper, opposite end 48 of spherical clamp 12 is pressed flush against movable surface 70. Spherical claim 12 is tightened. The angle of internal swivel section 46 relative to external fixed clamp section 44 may be equal to the angle that the tube is overbent. Cut tube section 62 may then be inserted into trimming saw 14 and tube 10 may be cut at the appropriate angle, providing gapless mating with a mating tube or fitting to be welded to tube 10.

While the above sample jig 66 has been described, the invention is not meant to be so limited. Any jig or other means may be used to align the spherical clamp at the appropriate angle for cutting.

By selecting the appropriate sized spherical clamp 12, any diameter tube may be cut. Spherical clamp 12 may be made of any appropriate material, such as aluminum, steel, or copper. Internal swivel section 46 may be made of the same or different material as external fixed clamp section 44. Internal swivel section 46 may be made of a plastic material in such cases where a nomar clamp is desirable.

It should be understood, of course, that the foregoing relates to preferred embodiments of the invention and that modifications may be made without departing from the spirit and scope of the invention as set forth in the following claims.

We claim:

1. A tube trimming system for cutting a tube comprising:
a trimming saw located on a first side of a work surface;
a hole in said work surface communicating said trimming saw with a second, opposite side of said work surface;

a spherically interfaced tube clamp for holding said tube;

a clamping system for holding said tube in a fixed location during a trimming operation wherein said tube is inserted from said second, opposite side of said work surface, through said hole, and trimmed by said trimming saw;

a saw blade, driven by a saw blade drive motor, located on said first side, said saw blade being movable from a non-cutting position to a cutting position, said cutting position being a position wherein said saw blade cuts said tube during operation;

a rotating column, having a diameter larger than that of said hole, being located below said hole, wherein a tube moving through said hole from said second, opposite side would move into said rotating column;

a rotation drive motor rotating said rotating column during operation of said trimming system; and said saw blade and said saw blade drive motor being attached to said rotating column wherein rotation of said rotating column rotates said saw blade and said saw blade drive motor.

2. The tube trimming system according to claim 1, further comprising a saw blade plunge motor for moving said saw blade from a non-cutting position to a cutting position.

3. The tube trimming system according to claim 2, further comprising:

an ultrasonic sensor for determining a diameter of said tube; and said ultrasonic sensor signaling said saw blade plunge motor to move said saw blade to a cutting position sufficient to cut said tube.

4. The tube trimming system according to claim 1, wherein said spherically interfaced tube clamp comprises:

a fixed clamp section having a first arc section and a second arc section, said first arc section and said second arc section mating to form said fixed clamp section;

an internal swivel section having an arc cut out section removed therefrom;

an outside diameter of said internal swivel section being slightly larger than an inside diameter of said fixed clamp section such that said fixed clamp section exerts a pressure on said internal swivel section when said first arc section is mated with said second arc section;

said first arc section and said second arc section coming together, with said internal swivel section fitted thereinbetween, to clamp down on said internal swivel section as said first arc section and said second arc section are mated to form said fixed clamp section, thereby narrowing said cut out section and reducing an inside diameter of said internal swivel section;

said fixed clamp section clamping down on said internal swivel section to clamp said tube in place within said spherically interfaced tube clamp.

5. The tube trimming system according to claim 4, wherein:

said fixed clamp section has a first diameter being smaller than said hole and a second diameter being larger than said hole; and said second diameter acting as a stop, thereby fixing said tube in said hole when said spherically interfaced tube clamp is clamped on a tube and said tube is fed through said hole.

6. The tube trimming system according to claim 5, wherein said clamping system holds said tube in place by clamping said spherically interfaced tube clamp on said work surface.

7. The tube trimming system according to claim 4, further comprising a spherical interface on an inside diameter wall of said fixed clamp section, wherein said spherical interface retains said internal swivel section and allows said internal swivel section to swivel therein, thereby permitting said spherically interfaced tube clamp to clamp said tube at an angle relative to perpendicular.

8. The tube trimming system according to claim 1, further comprising a jig for aligning said spherically interfaced tube clamp at a desirable angle on said tube, said desirable angle being one which, when said tube is cut, requires minimal additional processing in order to be matched and welded to a second tube.

9. A tube trimming system for cutting a tube at a desired height and angle comprising:

a trimming saw, having a saw blade, being located on a first side of a work surface;

a saw blade drive motor rotating said saw blade;

said saw blade being movable from a non-cutting position to a cutting position, said cutting position being a position wherein said saw blade cuts said tube during operation;

a hole in said work surface communicating said trimming saw with a second, opposite side of said work surface;

a rotating column, having a diameter larger than that of said hole, being located below said hole, wherein a tube moving through said hole from said second, opposite side would move into said rotating column;

a rotation drive motor rotating said rotating column during operation of said trimming system;

said saw blade and said saw blade drive motor being attached to said rotating column wherein rotation of said rotating column rotates said saw blade and said saw blade drive motor;

a saw blade plunge motor for moving said saw blade from a non-cutting position to a cutting position;

a spherically interfaced tube clamp for holding said tube; and a clamping system for holding said tube in a fixed location during a trimming operation wherein said tube is inserted from said second, opposite side of said work surface, through said hole, and trimmed by said trimming saw.

10. The tube trimming system according to claim 9, wherein said spherically interfaced tube clamp comprises:

a fixed clamp section having a first arc section and a second arc section, said first arc section and said second arc section mating to form said fixed clamp section;

an internal swivel section having an arc cut out section removed therefrom;

an outside diameter of said internal swivel section being slightly larger than an inside diameter of said fixed clamp section such that said fixed clamp section exerts a pressure on said internal swivel section when said first arc section is mated with said second arc section;

said first arc section and said second arc section coming together, with said internal swivel section fitted thereinbetween, to clamp down on said internal swivel section as said first arc section and said second arc section are mated to form said fixed clamp section, thereby narrowing said cut out section and reducing an inside diameter of said internal swivel section; and said fixed clamp section clamping down on said internal swivel section to clamp said tube in place within said spherically interfaced tube clamp.

11. The tube trimming system according to claim 12, wherein:
said fixed clamp section has a first diameter being smaller than said hole and a second diameter being larger than said hole; and
said second diameter acting as a stop, thereby fixing said tube in said hole when said spherically interfaced tube clamp is clamped on a tube and said tube is fed through said hole.

12. The tube trimming system according to claim 11, wherein said clamping system holds said tube in place by clamping said spherically interfaced tube clamp on said work surface.

13. The tube trimming system according to claim 10, further comprising a spherical interface on an inside diameter wall of said fixed clamp section, thereby permitting said spherical interface to retain said internal swivel section and allow said internal swivel section to swivel therein, wherein said spherically interfaced tube clamp may clamp said tube at an angle relative to perpendicular.

14. A tube trimming system for cutting a tube at a desired height and angle comprising:
a trimming saw, having a saw blade, being located on a first side of a work surface;
a saw blade drive motor rotating said saw blade;
said saw blade being movable from a non-cutting position to a cutting position, said cutting position being a position wherein said saw blade cuts said tube during operation;
a hole in said work surface communicating said trimming saw with a second, opposite side of said work surface;
a rotating column, having a diameter larger than that of said hole, being located below said hole, wherein a tube moving through said hole from said second, opposite side would move into said rotating column;
a rotation drive motor rotating said rotating column during operation of said trimming system;
said saw blade and said saw blade drive motor being attached to said rotating column wherein rotation of said rotating column rotates said saw blade and said saw blade drive motor;
a saw blade plunge motor for moving said saw blade from a non-cutting position to a cutting position;
a spherically interfaced tube clamp, having a fixed clamp section and an internal swivel section, for holding said tube;
said fixed clamp section having a first arc section and a second arc section, said first arc section and said second arc section mating to form said fixed clamp section;
said internal swivel section having an arc cut out section removed therefrom;
an outside diameter of said internal swivel section being slightly larger than an inside diameter of said fixed clamp section such that said fixed clamp section exerts a pressure on said internal swivel section when said first arc section is mated with said second arc section;
said first arc section and said second arc section coming together, with said internal swivel section fitted thereinbetween, to clamp down on said internal swivel section as said first arc section and said second arc section are mated to form said fixed clamp section, thereby narrowing said cut out section and reducing an inside diameter of said internal swivel section;
said fixed clamp section clamping down on said internal swivel section to clamp said tube in place within said spherically interfaced tube clamp;
said fixed clamp section having a first diameter being smaller than said hole and a second diameter being larger than said hole;
said second diameter acting as a stop, thereby fixing said tube in said hole when said spherically interfaced tube clamp is clamped on a tube and said tube is fed through said hole;
a spherical interface on an inside diameter wall of said fixed clamp section, wherein said spherical interface retains said internal swivel section and allows said internal swivel section to swivel therein, thereby permitting said spherically interfaced tube clamp to clamp said tube at an angle relative to perpendicular; and
a clamping system for holding said tube in a fixed location during a trimming operation wherein said tube is inserted from said second, opposite side of said work surface, through said hole, and trimmed by said trimming saw.

* * * * *